Jan. 13, 1931. J. FINN 1,788,711
WINDSHIELD WIPER
Filed Dec. 11, 1929
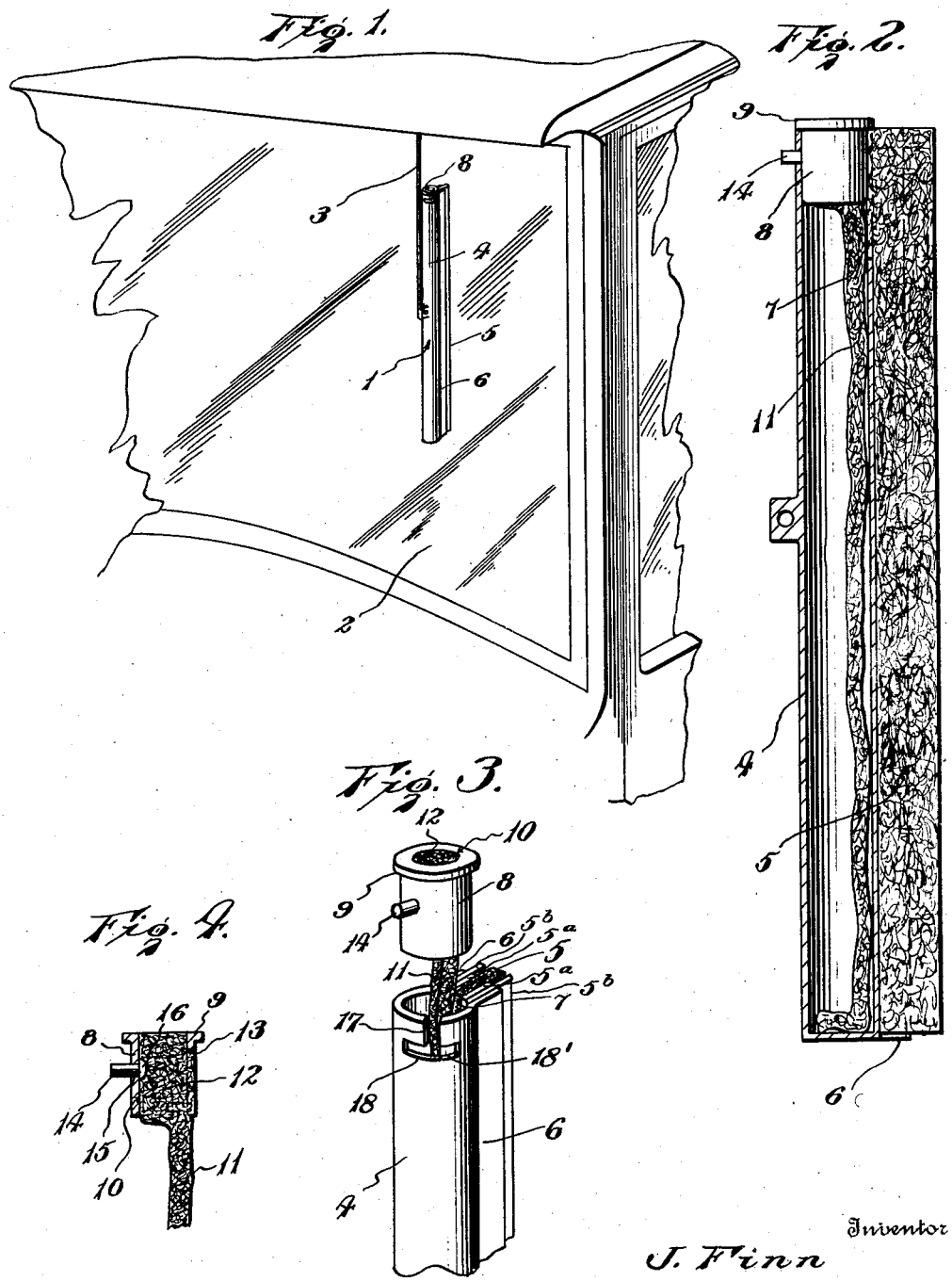
Inventor
J. Finn
By Lacey & Lacey, Attorneys Patented Jan. 13, 1931

1,788,711

UNITED STATES PATENT OFFICE

JAY FINN, OF ELMO, KANSAS

WINDSHIELD WIPER

Application filed December 11, 1929. Serial No. 413,364.

This invention relates to automobile accessories and more particularly to a wiper by means of which rain and dirt may be wiped from the portion of a windshield through which the driver of an automobile looks and still more particularly to a windshield wiper through the medium of which an anti-freezing solution may be applied to the windshield in order to melt ice and frozen snow which often accumulates upon a windshield and prevents the driver of the automobile from having a clear view through the windshield.

One object of the invention is to provide a windshield wiper in which the wiping strip is carried by a hollow body constituting a container or receptacle for an anti-freezing solution and permit this solution to be fed to the wiper in such a manner that too great a quantity of the solution will not be supplied to the wiper and drip from the same.

Another object of the invention is to provide the container with a plug for its open upper end serving not only as a closure for the container but also as a carrier for a wick by means of which the anti-freezing solution is delivered to the wiping strip.

Another object of the invention is to provide an improved connection between the plug and the upper end of the wick and cause the wick to be very firmly engaged with the plug.

Another object of the invention is to permit the plug to be securely held within the upper end portion of the container but easily released therefrom when it is necessary to refill or clean the container and also to permit the plug to be turned in the container to such a position that anti-freezing liquid will not be delivered to the wiping strip and thereby prevent the anti-freezing liquid from being applied to the windshield when not necessary.

The invention is illustrated in the accompanying drawing, wherein

Figure 1 is a perspective view showing the improved windshield wiper in operative relation to a windshield, Fig. 2 is a longitudinal sectional view through the windshield wiper, Fig. 3 is a perspective view of the upper portion of the windshield wiper with the plug released and the wick partially drawn out of the container or body portion of the wiper, and Fig. 4 is a sectional view through the plug and illustrating the manner in which the upper end of the wick is connected with the plug.

The windshield wiper, which is indicated in general by the numeral 1, is mounted in front of the windshield 2 of an automobile and is connected with a rod 3 which extends downwardly from operating means of a conventional construction and is adapted to have swinging movement imparted to it so that the windshield wiper moves in an arcuate path across the windshield in the usual manner. The body portion 4 of this wiper is hollow, as shown in Figure 2, and constitutes a container into which anti-freezing liquid is to be poured through the open upper end thereof. A wiping strip 5 formed of felt or any other suitable absorbent material extends longitudinally of the container and is firmly held in place between flanges or jaws 6 which extend longitudinally of the body and are spaced transversely from each other. Strips $5^a$ and $5^b$ of thin rubber are disposed between the strip 5 and flanges, the strips $5^b$ being extended to engage the windshield and assist in cleaning it. A longitudinally extending slot 7 is formed in the walls of the container or body between the flanges and through this slot extends a portion of the wiping strip, as shown clearly in Figure 2. Since the wiping strip is formed of felt or of similar material, dust and rain water may be very easily wiped from the portion of the windshield immediately in front of the driver of the automobile.

In order to close the open upper end of the container or body 4, there has been provided a plug 8 which fits into the container and at its upper end is formed with an outstanding marginal flange 9 to limit the extent to which it may be forced into the container and will allow it to be easily grasped and extracted. The plug or closure 8 is hollow, as shown in Figure 4, in order to form a pocket 10 which opens through the upper end of the plug and into this pocket is fitted the upper end of a wick 11. The wick is of sufficient length to extend the full depth of the container 4 and its upper end portion 12 which is preferably enlarged extends through a slot 13 formed in the walls of the plug so that when the plug is fitted into the container the portion of the wick which projects through the slot 13 may contact with the portion of the wiper extending through the slot 7, as shown in Figure 2. By referring to Figure 2, it will be seen that the portion of the wick immediately below the plug also contacts with the wiper and, therefore, the anti-freezing liquid which moves upwardly through the wick by capillary attraction will be delivered to the wiper and flow downwardly through the wiper. Therefore, the wiper will be moistened with antifreezing liquid and this liquid will be applied to the windshield and prevent ice from forming thereon or if ice has already formed the liquid will cause the ice to melt and flow off the portion of the windshield through which the driver of the automobile is to see.

In order to secure the plug in the upper portion of the container, there has been provided a pin 14 which is passed through an opening 15 formed in the plug and at its inner end the pin is provided with a head 16 which is embedded in the upper portion of the wick. It will thus be seen that when the wick is drawn downwardly through the plug until its enlarged upper end portion is disposed within the pocket 10 of the plug the wick will hold the pin in its extended position and since the head of the pin is embedded in the wick it will serve to prevent the wick from easily sliding through the plug and cause the wick to be firmly held in engagement with the plug so that it will be drawn out of the container when the plug is extracted. This pin is received in a bayonet slot 17 formed in the walls of the container and the slot is so located that after the pin has been moved downwardly through the open end of the slot and the plug then turned to dispose the pin in the closed inner end thereof the wick will make contact with the portion of the wiper extending inwardly through the slot 7. The side extension 18 at the inner end of the slot 17 is extended to form a second side extension 18′ which projects from the opposite side thereof so that the plug after being inserted may be turned in a reversed direction in order to secure it with the wick out of contact with the wiping strip. Therefore, anti-freezing liquid will be prevented from being delivered to the wiping strip and application of the anti- freezing liquid to the wiping strip will only take place when necessary.

Having thus described the invention, I claim:

1. In a windshield wiper, a container for an anti-freezing fluid open at its upper end and having its upper portion formed with a longitudinally extending slot, an absorbent wiping strip extending longitudinally of said container externally thereof with its upper portion extending along said slot, a removable closure for the upper end of said container, and a wick carried by said closure and extending longitudinally in the container with its upper portion contacting with said wiping strip through the slot.

2. In a windshield wiper, a container for an anti-freezing fluid open at its upper end and having its upper portion formed with a longitudinally extending slot, flanges extending longitudinally of said container with the slot located between their upper end portions, an absorbent wiping strip extending longitudinally of said container between said flanges and firmly held thereby with its upper portion extending along the slot, a wick in said container having its upper portion contacting with said wiping strip through said slot, and a removable closure for the upper end of said container having the upper end of said wick secured thereto whereby the wick may be drawn out of the container when the closure is released from the container.

3. In a windshield wiper, a container for an anti-freezing fluid open at its upper end and having its upper portion formed with a longitudinally extending slot, an absorbent wiping strip extending longitudinally of said container externally thereof, a wick in said container having its upper portion contacting with said wiping strip through said slot, and a removable closure for the upper end of said container fitting into the same and formed with a pocket opening through its inner end and having a side opening, the upper end portion of said wick being secured in the pocket and exposed through the side opening thereof for contact with the wiping strip, said closure constituting means for withdrawing the wick when released.

4. In a windshield wiper, a container for an anti-freezing fluid open at its upper end and having its upper portion formed with a longitudinally extending slot, flanges extending longitudinally of said container with the slot located between their upper ends, an absorbent wiping strip extending longitudinally of said container between said flanges with its upper portion extending along said slot, said strip being of greater depth than the flanges and projecting outwardly therefrom, rubber strips between said flanges and the wiping strip having their outer ends flush with the outer edge of the wiping strip, other rubber strips between the wiping strip and first-mentioned rubber strips terminating in spaced relation to the outer edge of the wiping strip and holding the first-mentioned rubber strips in spaced relation to the wiping strip, a wick in said container having its upper portion contacting with said wiping strip through said slot, a movable closure for the upper end of said container fitting into the same, means to releasably secure the closure when fitted into the container, said wick having its upper end connected with said closure, and said closure constituting means for withdrawing the wick when released.

In testimony whereof I affix my signature.

JAY FINN. [L. S.]